United States Patent
Brown

[11] 3,708,046
[45] Jan. 2, 1973

[54] ELECTRICALLY CONTROLLED BRAKE

[76] Inventor: Howard W. Brown, 2657 Shiras Avenue, Dubuque, Iowa 52001

[22] Filed: Sept. 23, 1970

[21] Appl. No.: 74,738

[52] U.S. Cl. .....................192/2, 188/171, 188/174, 318/372
[51] Int. Cl. ...........................................F16d 23/00
[58] Field of Search .............192/2; 188/171, 74, 174

[56] References Cited

UNITED STATES PATENTS

| | | | |
|---|---|---|---|
| 2,042,937 | 6/1936 | Henricksen | 192/2 |
| 1,435,934 | 11/1922 | Maimin | 192/11 |
| 2,688,719 | 9/1954 | Busquet | 188/171 X |
| 2,915,155 | 11/1959 | Raabe | 192/11 X |
| 2,949,989 | 8/1960 | Lindstrom et al. | 192/2 |

FOREIGN PATENTS OR APPLICATIONS

| | | | |
|---|---|---|---|
| 356,623 | 10/1961 | Switzerland | 192/2 |

*Primary Examiner*—Benjamin W. Wyche
*Attorney*—Andrew F. Wintercorn

[57] ABSTRACT

In this electrically controlled brake mechanism, a brake shoe, which normally gravitates to a braking position in engagement with a pulley wheel, so as to hold the wheel against turning when electrical power is turned off, or in the event of electrical power failure, is pivotally connected at its mid-point to one end of a link guided to move endwise tangentially relative to the circumference of the pulley wheel so that the brake shoe is retracted and allows free turning of the pulley wheel when the power is turned on, the link being operatively connected at its other end with the plunger of an electrical solenoid that is energized only when the main control switch is turned on for either forward or reverse operation of the drive motor. The motor circuit is not completed, however, until a servo-switch, that is normally in open circuit position, is thrown to closed circuit position by plunger operation of the aforesaid link. Thus, the motor does not start until a split second after the brake is released, which saves wear and tear on both the motor and the brake shoe. The combined weight of the link, the plunger, and the brake shoe assure good braking action, especially in view of the efficient angle of the downward substantially tangential travel of the shoe relative to the wheel to braking position. The compactness of the mechanism usually permits installation on the free side of a belt-driven pulley wheel.

16 Claims, 7 Drawing Figures

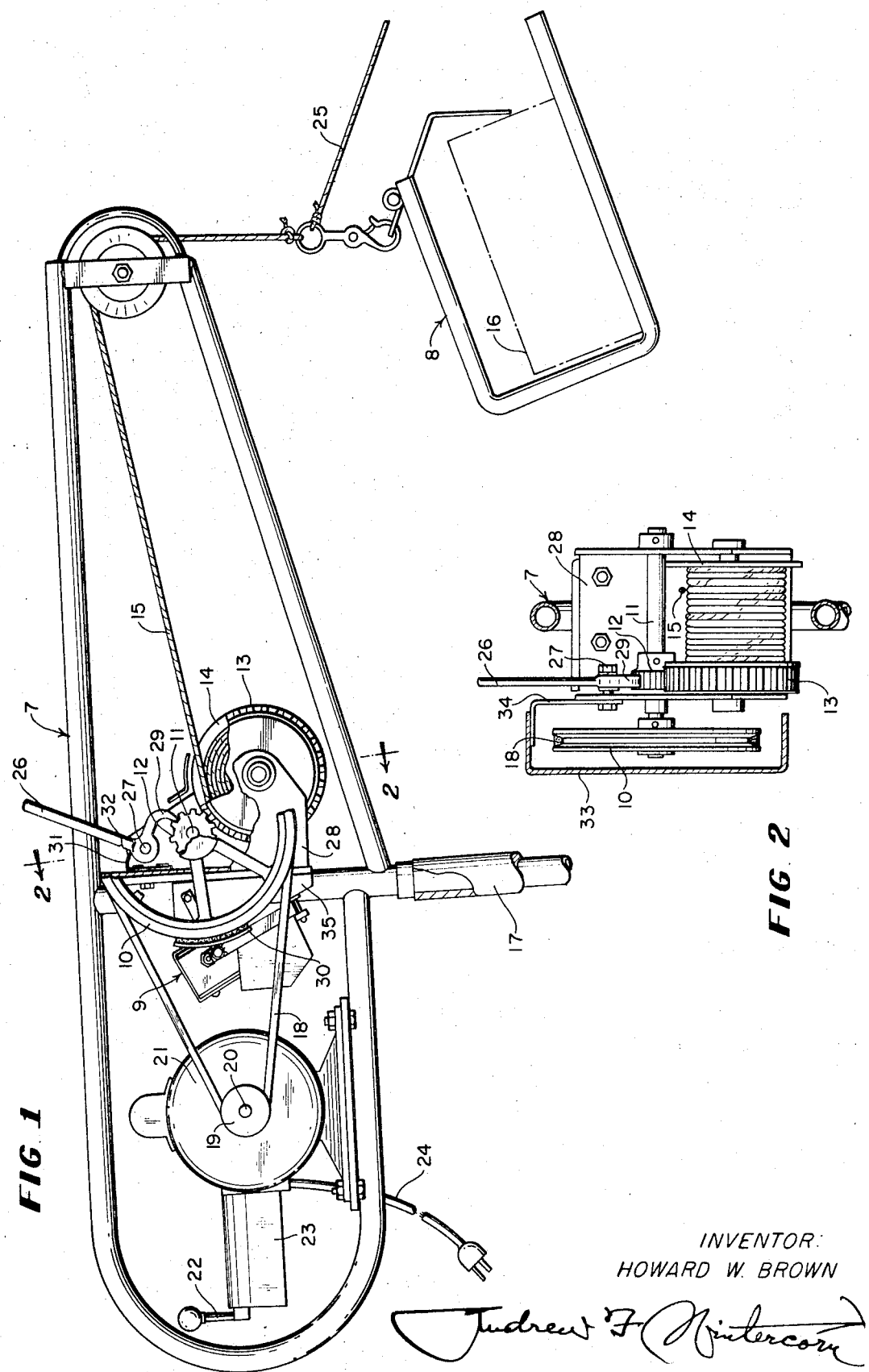
INVENTOR:
HOWARD W. BROWN
ATTORNEY

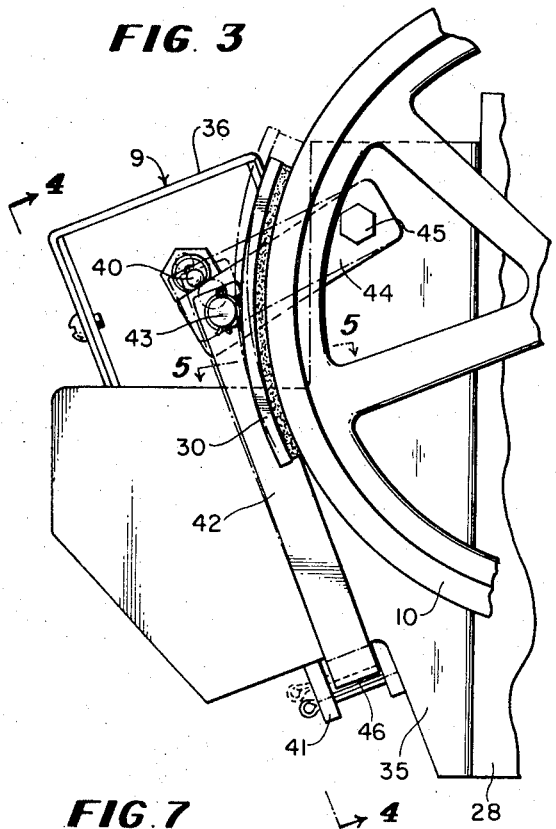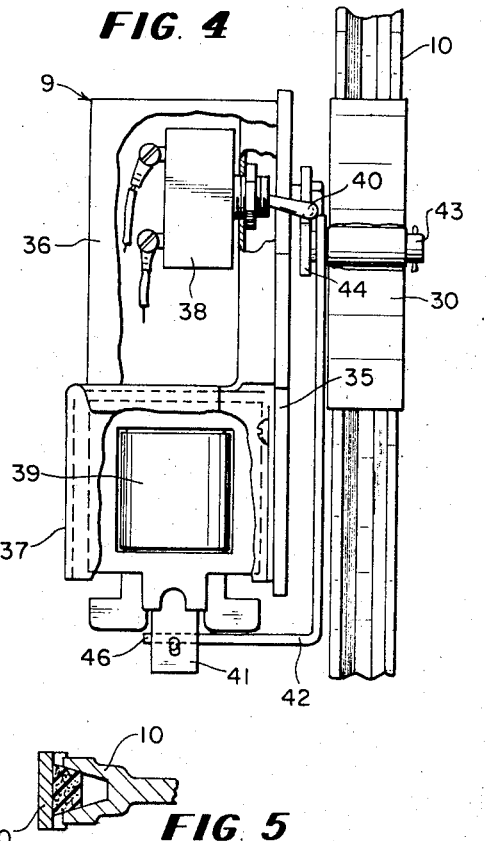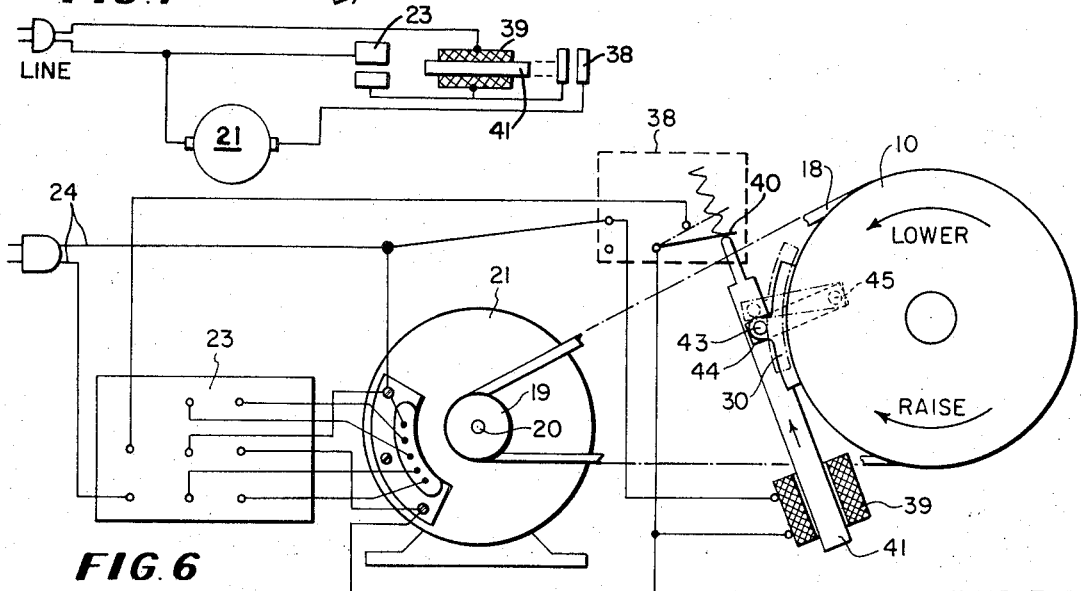

ELECTRICALLY CONTROLLED BRAKE

This invention relates to an electrically controlled brake and, while it is herein illustrated in connection with a portable hoisting unit, forming the subject matter of Gene S. Sullivan application Ser. No. 14,493, filed Feb. 26, 1970, assigned to me, it should be understood that my invention is not limited to that or any other specific application, but is useful wherever a motor operated device, machine or mechanism involves resersal in the direction of drive and there is a need for a brake that is instantaneously and automatically applied whenever the power is turned off, or in the event of power failure, and that is just as instantaneously and automatically released whenever the switch is turned on, as in the case of the portable hoisting unit where the switch may be turned on one way for lowering and another way for raising a load.

A salient feature of the present invention is the employment of an electrical solenoid, the plunger of which is mechanically connected with the brake shoe and at the same time is so arranged with respect to the operating arm of a toggle switch that is normally in an open-circuit position but adapted to be closed when its arm is swung the other way by reason of plunger movement upon energization of the coil of the solenoid whenever the reversible motor that operates the drum of the hoist is turned on, thus making for a much more positive and safely operated hoist than where a manually operated brake might otherwise be employed, which could not be relied upon as the one who should operate the manual brake might forget to do so or might happen to be in the wrong position to do so properly in a given emergency.

The invention is illustrated in the accompanying drawings, in which:

FIG. 1 is a side view of a hoisting unit similar to that forming the subject matter of the aforementioned Sullivan application, but showing the electrically controlled brake mechanism of my invention applied to the belt-driven pulley drivingly connected with the hoisting cable drum or winch;

FIG. 2 is a section on the line 2—2 of FIG. 1;

FIG. 3 is an enlargement of a portion of FIG. 1 to better illustrate the brake mechanism of my invention;

FIG. 4 is a rear view of FIG, 3 taken on the line 4—4 thereof;

FIG. 5 is a sectional detail on the line 5—5 of FIG. 3;

FIG. 6 is an electrical wiring diagram, and

FIG. 7 is a related electrical wiring diagram.

The same reference numerals are applied to corresponding parts throughout the views.

Referring to the drawings, the portable hoisting unit of the Sullivan application is indicated generally by the reference numeral 7, in FIGS. 1 and 2, and the hook or bail of that application is indicated at 8, while the electrically controlled brake of my invention to which further reference is made hereinafter is indicated generally by the reference numeral 9. The latter is operatively associated with the pulley wheel 10 that drives the shaft 11 and with it the pinion 12 meshing with the gear 13 that in turn drives the hoist cable drum or winch 14 on which the hoisting cable or line 15 for raising or lowering the load 16 with the hook or bail 8 is wound. The pulley 10 is driven by a belt 18 from the drive pulley 19 carried on the armature shaft 20 of a resersible electric motor 21. The latter is controlled by a manually operable switch lever 22 on the motor control box 23, which has a vertical neutral or "off" position, but is movable in one direction for "forward" running of motor 21 in the ascent of the hook 8 with the load 16 and the other way from neutral for "reverse" in the descent of the hook with the load, the motor 21 having its power cable 24 suitably connected to an extension cord (not shown) that in turn is connected to a source of electric current supply, all as outlined previously in the aforesaid Sullivan application. The man working the lead line 25 (FIG. 1) on the ground will, of course, work as one of a two-man team with a hoist operator on the roof or other elevated platform where the hoisting unit 7 is set up for swivel movement relative to a support, a part of which is shown at 17, the second man operating the control lever 22 on the motor control box 23 one way from the normal vertical neutral or "off" position for forward running of motor 21 in the ascent of the hook 8 with the load 16 and the other way from neutral for "reverse" in the descent of the hook with the load. A lever 26 pivoted at 27 relative to the frame 28 of the winch, as described in the aforesaid Sullivan application, is arranged to be switched by the operator on the roof or other elevated platform from a retracted position to engage a sprag hook 29 between teeth of the drive pinion 12 to lock the winch 14 by means of the driven gear 13 when, for example, the hook 8 with the load 16 reaches the roof or platform level and it is advisable for safety reasons to lock the winch while the hook 8 is pulled in and its load is taken off. Even though the electrically controlled brake 9 of my invention is designed to give reliable and safe operation under all forseeable conditions, such as power failure, it is considered best to have this manually operated locking feature as a matter of additional safety in case of malfunctioning of the automatically operable brake shoe 30 forming a part of the electrically controlled brake 9 of my invention. Lever 26 is normally locked by a leaf spring catch 31 in a retracted vertical position by engagement in a notch 32 provided in the back of the lever. A guard 33 suitably supported on brackets 34 relative to the frame 28 and base of motor 21 encloses the belt 18 on the driving and driven pulleys 20 and 10, respectively, so there is no danger of the operator or a nearby workman being injured by coming into contact with the moving parts.

FIG. 7, the simplified wiring diagram, serves to show that when switch 23 is closed in either direction, it causes energization of the solenoid 39, causing core 41 to move (so as to release the brake 30) and simultaneously close the motor switch 38, starting motor 21.

Referring now to FIGS. 1 and 3 to 7, the brake mechanism 9 of my invention is carried on a bracket 35 rigidly secured to the back of the frame 28 and carrying housings 36 and 37 that enclose a toggle type servo-switch 38 and an electrical solenoid 39, respectively. The switch 38 has its spring pressed lever 40 disposed normally in an open circuit position, and the plunger 41 of the solenoid 39 normally gravitates to a retracted position for braking as shown by the full line position of the brake shoe 30, in FIG. 3. However, an L-shaped link 42, the upper end of one arm of which is pivotally connected, as at 43, to the mid-portion of the shoe 30 on the back thereof, and is guided for endwise movement substantially tangentially with respect to the circumference of the pulley wheel 10 by means of a link 44 secured to one end of the pin 43 and pivoted, as at 45, at its other end for oscillation with respect to the bracket 35, is arranged upon energization of the solenoid 39 to move upwardly by reason of its connection by its other arm, as at 46, with the forked lower end of the plunger 41 so as to shift the brake shoe 30 to a retracted position, as indicated in dotted lines in FIG. 3, and also throw the switch lever 40 to the "on" position to complete the circuit through the reversible electric motor 21 for forward or reverse operation thereof, depending upon which direction the control lever 22 has been moved. Thus, the motor 21 does not start until a split second after the brake has been released, which saves wear and tear on both the motor and the brake shoe. The combined weight of the links 42 and 44, plunger 41, and brake shoe 30 assures good braking action when the power is turned off, especially in view of the efficient angle of downward travel of the shoe 30 relative to the wheel 10 to braking position. The compactness of the mechanism 9 usually permits installation thereof, as shown, on the free side of the belt driven pulley.

In operation, the brake shoe 30, which normally gravitates to a braking position in engagement with the pulley wheel 10, is helped in that direction by the weight of the links 42 and 44, and plunger 41 to hold the wheel 10 against turning when electrical power is turned off or in the event of electrical power failure. This shoe is pivotally connected at its mid-point on the outer side to one end of the link 42 that is guided by the link 44 to move endwise substantially tangentially relative to the circumference of the pulley wheel 10, so that the brake shoe is retracted and allows free turning of the pulley wheel 10 when the power is turned on, the link 42 being operatively connected at its other end, as at 46, to the plunger 41 of the solenoid 39 that is energized only when the main control switch 23 is turned on for either forward or reverse operation. Thus, motor 21 will not start before the brake is released nor will the brake be applied before the motor is turned off. This saves wear and tear on both the motor and the brake shoe. Weighting of the brake shoe 30 by links 42 and 44 and plunger 41 assures its dropping immediately to braking position upon stoppage of the motor whether that is caused by manual operation of switch 23, or by power failure, or by disconnection of cable 24. In any emergency, the sprag 29 can also be used to lock the parts against turning.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. In an electrically controlled brake mechanism the combination with a drive pulley and a driven pulley wheel drivingly connected by a belt, and an electric motor connected for transmitting drive to the drive pulley, of a brake shoe disposed in braking relationship to the pulley wheel on the free side thereof relative to the belt, an electrical solenoid having a plunger that is operatively connected with the brake shoe to gravitate and move the shoe in one direction to braking position with power off and the solenoid deenergized but move the shoe oppositely to retracted position relative to the pulley wheel when the solenoid is energized with power on, means whereby the shoe upon application of the brake moves downwardly with the plunger on a line substantially tangent to the pulley wheel for a binding action in the application of the brake, the combined weight of the plunger and shoe applying the brake, a main switch for connecting said motor to a source of electric current supply, and a normally open servo-switch electrically connected with the solenoid and main switch and source of electric current supply and mechanically operable to closed position by solenoid operation of the plunger.

2. The combination as set forth in claim 1 including a link that is movable on a line parallel to a tangent relative to the circumference of said pulley wheel said link being operatively connected for reciprocation at one end to said plunger and connected at its other end to said brake shoe and a second link pivotally connected at one end to the last named end of said first mentioned link and at its other end to a fixed support to guide the first link and shoe for movement on the line mentioned.

3. The combination as set forth in claim 1 including a link that is movable on a line parallel to a tangent relative to the circumference of said pulley wheel and inclined relative to a vertical outwardly with respect to said wheel, said link being operatively connected for reciprocation at one end to said plunger and connected at its other end to said brake shoe, and a second link pivotally connected at one end to the last named end of said first mentioned link and at its other end to a fixed support to guide the first link and shoe for movement on the line mentioned.

4. The combination as set forth in claim 1 including a link that is movable on a line parallel to a tangent relative to the circumference of said pulley wheel, said link being operatively connected for reciprocation at one end to said plunger and connected at its other end to said brake shoe, and a second link pivotally connected at one end to the last named end of said first mentioned link and at its other end to a fixed support to guide the first link and shoe for movement on the line mentioned, the servo-switch being so disposed relative to one of said links for operation thereof to closed position in the retracting movement of the brake shoe.

5. The combination as set forth in claim 1 including a link that is movable on a line parallel to a tangent relative to the circumference of said pulley wheel, said link being operatively connected for regiprocation at one end to said plunger and pivotally connected at its other end to the mid-point of said brake shoe, and a second link pivotally connected at one end to the shoe and last named end of said first mentioned link at their pivotal connection with one another and pivoted at its other end to a fixed support to guide the first link and shoe for movement on the line mentioned.

6. The combination as set forth in claim 1 including a link that is movable on a line parallel to a tangent relative to the circumference of said pulley wheel, said link being operatively connected for reciprocation at one end to said plunger and pivotally connected at its other end to the mid-point of said brake shoe, and a second link pivotally connected at one end to the shoe and last named end of said first mentioned link at their pivotal connection with one another and pivoted at its other end to a fixed support to guide the first link and shoe for movement on the line mentioned, the servo-switch being so disposed relative to the movable outer end of said second link for operation thereof to closed position in the retracting movement of the brake shoe.

7. The combination as set forth in claim 1 wherein said electric motor is reversible and the main switch is so connected electrically with the motor, servo-switch and solenoid that in either on position of the main switch the solenoid is energized to cause the plunger to retract the brake shoe and close the servo-switch.

8. In combination with a driven wheel and an electric motor connected to transmit drive to said wheel, an elongated brake shoe movable substantially endwise into and out of braking relationship to said wheel, the movement into braking position being by gravity, an electrical solenoid having a plunger that is operatively connected with the brake shoe to gravitate and move with the shoe by gravity to braking position with power off and the solenoid deenergized but move the shoe substantially endwise to retracted position relative to the wheel when the solenoid is energized with power on, a main switch for connecting said motor to a source of electric current supply, and a normally open servo-switch electrically connected with the solenoid and main switch and source of electric current supply and mechanically operable to closed position by solenoid operation of the plunger.

9. The combination as set forth in claim 8 including a link that is movable on a line parallel to a tangent relative to the circumference of said wheel, said link being operatively connected for reciprocation at one end to said plunger and connected at its other end to said brake shoe, and a second link pivotally connected at one end to the last named end of said first mentioned link and at its other end to a fixed support to guide the first link and shoe for movement on the line mentioned.

10. The combination as set forth in claim 8 including a link that is movable on a line parallel to a tangent relative to the circumferenc of said wheel and inclined relative to a vertical outwardly with respect to said wheel, said link being operatively connected for reciprocation at one end to said plunger and pivotally connected at its other end to a mid-point of said brake shoe, and a second link pivotally connected at one end to the last named end of said first mentioned link and at its other end to a fixed support to guide the first link and shoe for movement on the line mentioned.

11. The combination as set forth in claim 8 including a link that is movable on a line parallel to a tangent relative to the circumference of said wheel, said link being operatively connected for reciprocation at one end to said plunger and connected at its other end to said brake shoe, and a second link pivotally connected at one end to the last named end of said first mentioned link and at its other end to a fixed support to guide the first link and shoe for movement on the line mentioned, the servo-switch being so disposed relative to one of said links for operation thereof to closed position in the retracting movement of the brake shoe.

12. The combination as set forth in claim 8 including a link that is movable on a line parallel to a tangent relative to the circumference of said wheel, said link being operatively connected for reciprocation at one end to said plunger and pivotally connected at its other end to the midpoint of said brake shoe, and a second link pivotally connected at one end to the shoe and last named end of said first mentioned link at their pivotal connection with one another and pivoted at its other end to a fixed support to guide the first link and shoe for movement on the line mentioned.

13. The combination as set forth in claim 8 includ a link that is movable on a line parallel to a tangent relative to the circumference of said wheel, said link being operatively connected for reciprocation at one end to said plunger and pivotally connected at its other end to the mid-point of said brake shoe, and a second link pivotally connected at one end to the shoe and last named end of said first mentioned link at their pivotal connection with one another and pivoted at its other end to a fixed support to guide the first link and shoe for movement on the line mentioned.

14. The combination as set forth in claim 8 wherein said electric motor is reversible and the main switch is so connected electrically with the motor, servo-switch and solenoid that in either on position of the main switch the solenoid is energized to cause the plunger to retract the brake shoe and close the servo-switch.

15. In combination, an electric motor, a wheel driven thereby, a control switch, said motor having a servo-switch that is normally in open circuit position and connected in circuit with the motor and control switch to complete the circuit through the motor when closed, a solenoid connected with the control switch to be energized when the latter is closed, a gravitating plunger movable in one direction against gravity when the solenoid is energized, a brake element connected to and movable with said plunger and operatively associated with the aforesaid wheel, the brake element being normally held by its gravity and that of said plunger in braking position but operable against gravity to retracted position upon energization of said solenoid, and means guiding said plunger in its substantially endwise movement to retracted position by said plunger and in a direction substantially parallel to a tangent to said wheel, said servo-switch being also connected mechanically so as to be operable to closed position by said plunger upon energization of said solenoid.

16. The combination set forth in claim 15 wherein the electric motor is reversible and the control switch is operable in one direction for forward drive and in another direction for reverse drive, said solenoid being energized upon closing of said switch regardless of which direction of drive is selected.

* * * * *